March 22, 1927.
F. W. CALDWELL
IMPELLER
Filed July 1, 1925
1,622,222
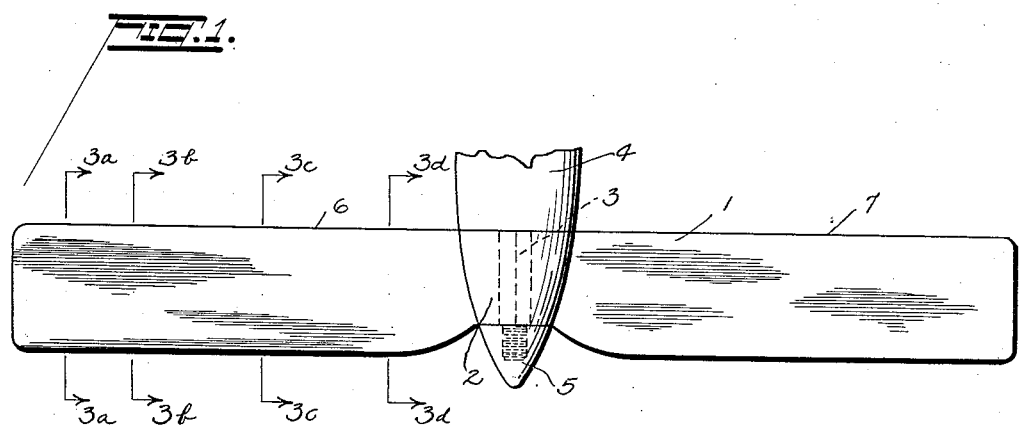
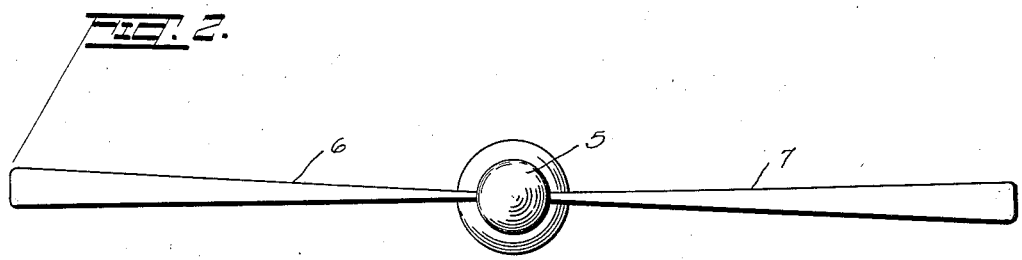
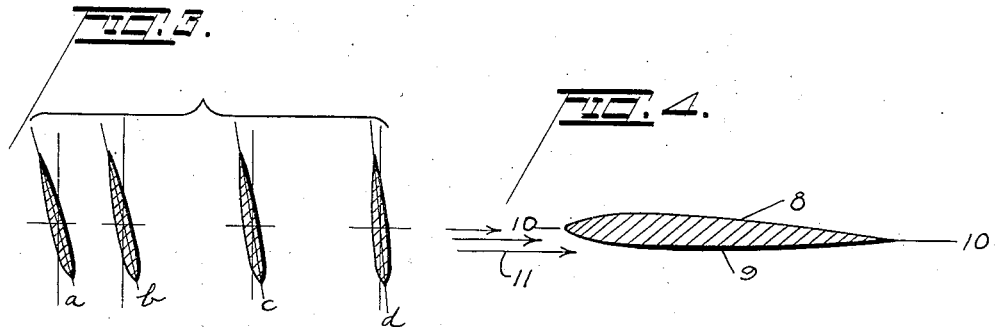
INVENTOR
F. W. CALDWELL
BY Robert H. Young
ATTORNEY Patented Mar. 22, 1927.

1,622,222

UNITED STATES PATENT OFFICE.

FRANK W. CALDWELL, OF DAYTON, OHIO.

IMPELLER.

Application filed July 1, 1925. Serial No. 40,806.

This invention relates to impellers suitable for measuring speed of travel through the air, or for indicating the total air distance covered. The impeller is herein shown particularly adapted for use on airplanes but the principles of my invention are equally susceptible of use to impellers which operate in a denser medium such as water.

The primary object of the invention is the provision of an impeller which will have a speed of rotation exactly proportional to the speed of travel through the medium in which it operates. It has been found that the impellers which have heretofore been used in anemometers for air distance indicators on airplanes have a speed of rotation which is not exactly proportional to the speed of translation through a wide range of normal speeds of operation. This has been due to the fact that non-symmetrical aerofoil sections have been used, since such a section produces various lifts dependent upon the speed of rotation, and consequently if the amount of work done per revolution by such an impeller is constant, the speed of rotation would not be proportional to the speed of translation as it should be.

It is therefore an object of this invention to provide an impeller blade which operates substantially at the no-lift point, by designing the blade of suitably large size in proportion to the load driven thereby. When such a blade as just mentioned is provided with symmetrical double convex opposing surfaces with the various sections of the blades, arranged to travel through the same linear distance for each revolution, the angle of substantially zero lift at which the sections operate will be maintained constant, practically coinciding with the angle of the line of symmetry through each section. This is true, as is almost self-evident due to the fact that the angle of zero lift of a symmetrical aerofoil section exactly corresponds to the line of symmetry of the section, which line is exactly in the direction of the airstream when the blade is of large size so as to operate substantially at the no-lift point. Changes in air speed are immaterial and have no tendency toward varying the no-lift angle of any sections.

Further objects of my invention will be more fully set forth in detail in the following description, in the claims and in the drawings, in which Fig. 1 is a plan view of an impeller in accordance with my invention.

Fig. 2 is a front elevation thereof.

Fig. 3 is a view of various sections of a blade taken at varying distances from the axis of rotation, as at $a$ $b$ $c$ and $d$ and Fig. 4 is an enlarged detail section at any point through the blade.

Referring more particularly to the drawings, 1 designates an impeller generally which is provided with a hub portion 2, mounted on a spindle 3 on the front end of a fixed support 4, which might form any projecting portion of an airplane or other similar device, the speed of which is to be indicated. A streamlined forward nose portion 5 is preferably provided in front of the hub. The impeller is provided with two identical blades 6 and 7 which are of constant width throughout practically their entire lengths as shown in Fig. 1. Each blade is provided with the two opposed curved convex symmetrical surfaces 8 and 9 which are identical in form, and symmetrically arranged about a line of symmetry passing through the leading and trailing edges of the section. This line of symmetry is indicated at 10—10 in Fig. 4 and the length of the line of symmetry which corresponds to the width of the blade is preferably designed therefor to be about ten times the total thickness of the blade at its thickest point, which is about one-third the distance back from the leading edge thereof. The various sections $a$, $b$, $c$ and $d$ taken on section lines corresponding thereto in Fig. 1, show that the cotangent of the angle of the blade sections at any point along the blade to the axis of rotation is exactly proportional to the distance of the section from the said axis. This is true so that at any distance from the axis of rotation the blade section is arranged to screw itself through the medium in which it operates, a distance corresponding to that traveled by all other sections. The lines of symmetry of the various sections shown in Fig. 3 therefore meet at the extended axis of rotation at a common point. The pitch angle of any section is the angle between its line of symmetry and the plane of revolution or the common plane passing through the centers of all of the sections, this pitch angle of any section being correspondingly smaller than the pitch angle of any section closer to the axis of rotation as previously mentioned.

It will now be clear that since the impeller is of suitably large size in comparison to the load it is to operate, so that it will operate at substantially a zero lift, and since the blade sections have been designed to have symmetrically arranged opposite faces, every section of the blade will operate at an angle to the air-flow which is substantially zero, and which will be constant regardless of the speed of rotation of the impeller, since this angle practically corresponds to the line of symmetry through the section. This angle of no lift cannot change as the speed changes, since it is a fixed geometrical quantity and the speed of rotation of the impeller will always be exactly proportional to the relative air speed for that reason.

Since the load or work done by the impeller will always be some finite amount, the line of symmetry 10 in Fig. 4 will not exactly correspond to the direction of the wind shown by the arrows 11. Instead, these two lines will be at some small angle which however is so small as to be negligible as regards its effect on the speed of rotation, and its effect towards varying the angle of small minimum lift as the speed varies.

I am aware that various changes may be made in my invention without departing from the spirit or scope thereof, and it is obvious that the impeller may be used to operate in various mediums and at various normal speeds of operation and to carry various loads. Furthermore, it is contemplated that the impeller blade sections may be made of varying shapes it being important however that the angle of substantially zero lift or the angle corresponding to the small lift at which the blades designed to operate should remain constant, regardless of the normal speed of rotation.

I claim:

1. In an impeller adapted to be driven by the medium in which it operates, a blade having a section in which the angle of substantially zero lift is constant regardless of the speed.

2. An impeller blade in which the speed of rotation is proportional to its speed of relative forward travel having a double convex section in which the angle of substantially zero lift is constant regardless of the speed.

3. In an impeller adapted to be driven by the medium in which it operates at a speed of rotation proportional to the speed of relative motion, a blade having a symmetrical double convex section, the speed of revolution thereof being proportional to the relative speed of movement of the medium in which it operates.

4. In an impeller, a blade having the various sections thereof at various angles to the axis of rotation proportional to the distance of the section from the axis, said sections having convex opposite faces, the angle of substantially zero lift of said individual sections being constant regardless of speed.

5. In an impeller, a blade having the various sections thereof at various angles to the axis of rotation proportional to the distance of the section from the axis, said sections having convex opposite faces which are symmetrical about lines through the leading and trailing edges, said lines practically corresponding to the lines of zero lift at the sections for all speeds of operation.

6. In an impeller of the class described, a hub, a pair of blades thereon of constant width and having a thickness about 10% of the width thereof, said blades having opposite convex surfaces of the same curvature symmetrically arranged.

7. In a device of the class described, a hub, a pair of blades thereon of constant width and having a thickness about 10% of the width thereof, said blades having opposite convex surfaces of the same curvature symmetrically arranged, so that the line of zero lift at any section corresponds practically to the line of symmetry through the leading and trailing edge, said blade being in position to be operated at substantially zero lift.

In testimony whereof I affix my signature.

FRANK W. CALDWELL.